(12) United States Patent
Diemer

(10) Patent No.: US 7,649,700 B1
(45) Date of Patent: Jan. 19, 2010

(54) PERIPHERAL VISION HELMET

(75) Inventor: Joel A. Diemer, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 431 days.

(21) Appl. No.: 11/674,906

(22) Filed: Feb. 14, 2007

Related U.S. Application Data

(60) Provisional application No. 60/773,474, filed on Feb. 14, 2006.

(51) Int. Cl.
G02B 7/02 (2006.01)
A63B 71/10 (2006.01)

(52) U.S. Cl. .............................. 359/811; 2/425; 2/424; 2/10; 345/8

(58) Field of Classification Search .............. 359/811, 359/642; 2/6.3, 6.6, 6.7, 7–10, 15, 410, 411, 2/421, 422, 424, 425, 439, 441; 351/44, 351/50, 61, 84, 86, 155, 159, 174; 345/7–9; 128/201.27, 207.11
See application file for complete search history.

(56) References Cited

U.S. PATENT DOCUMENTS

| 3,691,565 | A | * | 9/1972 | Galonek | 2/431 |
| 3,751,728 | A | | 8/1973 | Thompkins | |
| 3,787,109 | A | | 1/1974 | Vizenor | |
| 4,651,357 | A | | 3/1987 | Gershoni | |
| 4,722,101 | A | | 2/1988 | Blower et al. | |
| 5,101,517 | A | | 4/1992 | Douglas | |
| 5,134,521 | A | | 7/1992 | Lacroix et al. | |
| 5,416,536 | A | | 5/1995 | Tee, Jr. | |
| 5,585,813 | A | * | 12/1996 | Howard | 345/8 |
| 6,295,653 | B1 | | 10/2001 | Puleo | |
| 2002/0174480 | A1 | | 11/2002 | Lombard | |
| 2003/0115661 | A1 | | 6/2003 | Dobbie et al. | |
| 2003/0188375 | A1 | | 10/2003 | Wilson et al. | |
| 2005/0206841 | A1 | | 9/2005 | Saderholm et al. | |

* cited by examiner

Primary Examiner—Loha Ben
(74) Attorney, Agent, or Firm—Deborah A. Peacock; Peacock Myers, P.C.

(57) ABSTRACT

An apparatus for providing enhanced peripheral vision to a wearer of a helmet in accordance with the present invention includes at least one lens member adapted to be received at a predetermined location in the helmet. The lens member is operable to direct light from a side portion of the helmet to a location adjacent the eyes of a wearer of the helmet.

22 Claims, 2 Drawing Sheets

PERIPHERAL VISION HELMET

CROSS-REFERENCE TO RELATED APPLICATIONS

This application claims priority to and the benefit of the filing of U.S. Provisional Patent Application Ser. No. 60/773,474, entitled "A Helmet Technology To Provide/Restore Full Peripheral Vision to Users", filed on Feb. 14, 2006, and the specification thereof is incorporated herein by reference.

BACKGROUND OF THE INVENTION

The present invention relates in general to helmets and helmet devices.

One of the casualties of on-going efforts to improve the safety of football helmets in particular and safety helmets in general is the obstruction or total loss of peripheral vision. The football helmet has evolved from a form fitting, leather, aviator-style cap to today's high-impact plastic, shock absorbing crash helmet. This high-tech box is further augmented for player safety with padded chin strap, and face cage. For linemen, a wrap-around plexiglass shield for eye protection may also be added. While all these features add to player safety, the effect is to limit the field of the player's vision. The vision restrictive nature of the helmet is sometimes compounded with padding and structural features on shoulder pads which nominally protect against rotational and snap back injuries to the neck, which limits the view of the player to that similar to a tunnel.

That the players' peripheral vision is compromised is on display wherever football is being played. Virtually all players to greater or lesser extent display the same exaggerated "turn to Look" behavior when on the field of play. While on the surface this may not be much of a problem, lack of peripheral vision undoubtedly results in injury when contact from the side or back is unexpected, not to mention the innumerable dropped passes, missed tackles and blocks, and quarterback sacks.

It is desirable, therefore, to provide a helmet apparatus that provides peripheral vision to the wearer of a helmet.

BRIEF SUMMARY OF THE INVENTION

An apparatus for providing enhanced peripheral vision to a wearer of a helmet in accordance with the present invention includes at least one lens member adapted to be received at a predetermined location in the helmet. The lens member is operable to direct light from a side portion of the helmet to a location adjacent the eyes of a wearer of the helmet.

In one embodiment, the lens member is a wedge prism lens member. Alternatively, the lens member is a Fresnel-type lens member. Alternatively, the lens member is a magnifying lens member. Alternatively, the lens member refracts light from the side portion of the helmet along a predetermined refracting angle to the location adjacent the eyes of the wearer of the helmet. Alternatively, the lens member is shaded. Alternatively, the lens member includes a polarizing medium disposed thereon.

Alternatively, the lens member is a pair of lens members disposed on opposing sides of said helmet. Alternatively, the lens member includes a central portion curved outwardly with respect to outer portions of the lens member. Alternatively, the lens member is formed from an optics-grade material. Alternatively, the lens member is formed from a polycarbonate material. Alternatively, the lens member is a pair of lens members joined together.

Another embodiment of the present invention provides a helmet assembly for providing enhanced peripheral vision to a wearer of a helmet that includes a helmet member having a helmet portion and an open face portion. The helmet member defines at least one receiving portion at a predetermined location therein. The assembly includes at least one lens member adapted to be received in the receiving portion of the helmet member and is operable to refract or direct light from a side portion of the helmet to a location adjacent an eye level of a wearer of the helmet.

Another embodiment of the present invention provides a helmet assembly for providing enhanced peripheral vision to a wearer of a helmet that includes a helmet member having a helmet portion and an open face portion. The helmet member defines a pair of receiving slots formed on opposing sides of the helmet portion adjacent the open face portion adjacent an eye level of a wearer of the helmet. The assembly also includes a pair of lens members received in the receiving slots that are operable to refract or direct light from a side portion of the helmet to a location adjacent the eye level of the wearer of the helmet along a predetermined refracting angle.

The present invention advantageously provides a modification to a helmet in the form of a customizable, optical-grade lens member that employs the concept of light refraction through a prism or the like. The present invention advantageously retains an original field of vision area of the helmet but enhances peripheral vision to the user of the helmet. The helmet may be any type of helmet including, but not limited to, a helmet for football, skiing, hockey, car racing, cycling, motorcycling, bicycling, and any other activity where a helmet is worn and where it is desirable to enhance the peripheral vision of the wearer of the helmet.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
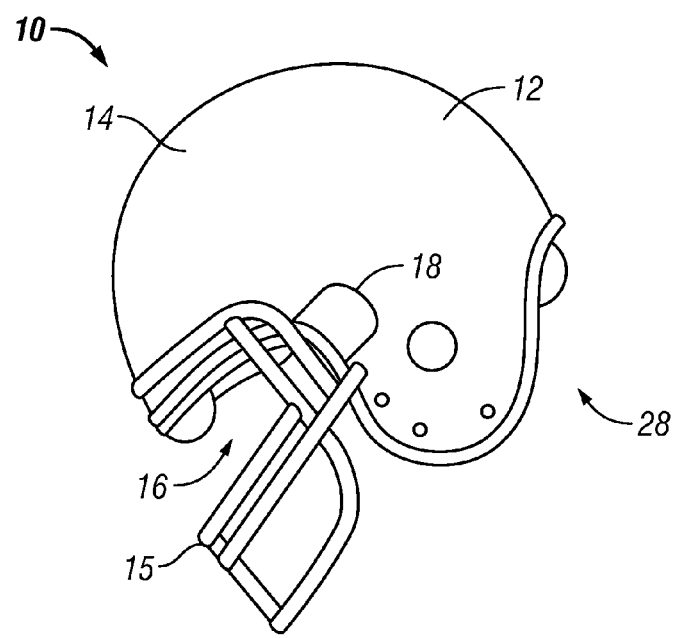
FIG. 1 is a side perspective view of a helmet apparatus in accordance with the present invention.
Figure 2:
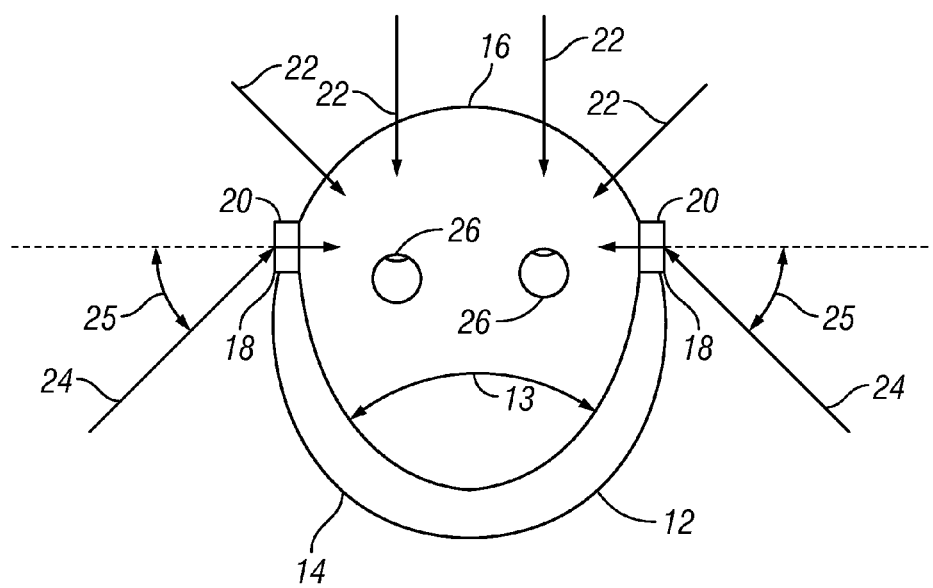
FIG. 2 is a schematic plan view of the helmet of FIG. 1.

Referring now to FIGS. 1-2, an apparatus in accordance with the present invention is indicated generally at 10. Apparatus 10 includes helmet member 12 adapted to be worn on the head of a wearer (not shown). Helmet 12 includes helmet portion 14 and open face portion 16, as will be appreciated by those skilled in the art. Helmet portion 14 of helmet 12 defines receiving recess or slot 18 formed at a predetermined location adjacent open face portion 16. The predetermined location of receiving slot 18 is preferably determined by the location and level of the eyes of the wearer of helmet 14, discussed in more detail below. Preferably, helmet portion 14 defines at least two receiving slots 18 on opposing sides of helmet portion 14 and preferably adjacent an eye level of the wearer of helmet 12, discussed in more detail below, of helmet portion 14 adjacent open face portion 16. The location of receiving slot or slots 18 is selected to not interfere with properties of helmet 12 such as, but not limited to, impact resistance, impact strength, ability to attach masks 15 or other suitable enclosures for open face portion 16 and the like.

Lens member 20 is received in receiving slot 18. Lens member 20 is preferably formed from an optical grade polycarbonate material or any other suitable optical grade material, discussed in more detail below. Helmet 12 also includes padding 13 on an interior surface thereof, best seen in FIG. 2.

Light enters face portion 16 of helmet 12 from many forward-facing directions, indicated by arrows 22. Lens member 20 directs light, such as by refraction or the like, from the side or the rear directions of helmet portion 14, indicated by arrows 24, towards eye location of the wearer, indicated generally at 26 in FIG. 2. Light 24 is directed by lens member 20 by refracting light 24 along refractive angle 25, which is the angle of light 24 with respect to the axis of the light directed towards eye location 26. Preferably, light 24 is directed by lens member 20 to the eye level of the wearer of helmet 12. By directing light 24 from side or rear of helmet portion 12, helmet 12 enhances peripheral vision of the wearer of helmet 12 and thereby increases safety, as the wearer does not have to turn his or her head in order to view objects, etc. along the side of helmet 12. Refractive angle 25 of lens member 20 may be any angle, as long as lens member 20 is designed to be able to refract or direct light 24 to eye location 26.

Figure 3:
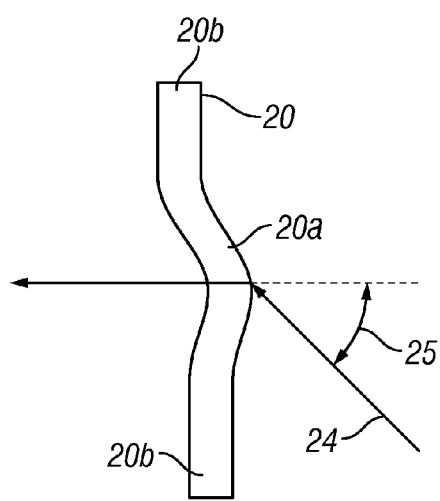
FIG. 3 is a sectional schematic view of a lens member in accordance with the present invention and FIG. 4 is a sectional schematic view of an alternative lens member alternative in accordance with the present invention.

As shown in FIG. 3, lens member 20 preferably includes a central portion 20a of lens member 20 that is curved outwardly with respect to outer portions 20b of lens member 20 and light source 24 to direct light source 24 to eye location 26, as will be appreciated by those skilled in the art. Alternatively, lens member 20 may be a Fresnel-type lens, a wedge prism, or includes other optical modifications capable of directing light and images from the side or back of helmet portion 14, as dictated by the preferred use of helmet 12, as will be appreciated by those skilled in the art. Alternatively, lens member 20 is a magnifying lens or a shaded lens. Preferably, lens member 20 is fused to interior surface (not shown) of helmet portion 14 defined by receiving slot 18 to become an integral part of helmet portion 14. When attached, lens member 20 and helmet 12 form a helmet assembly, indicated generally at 28.

Figure 4:
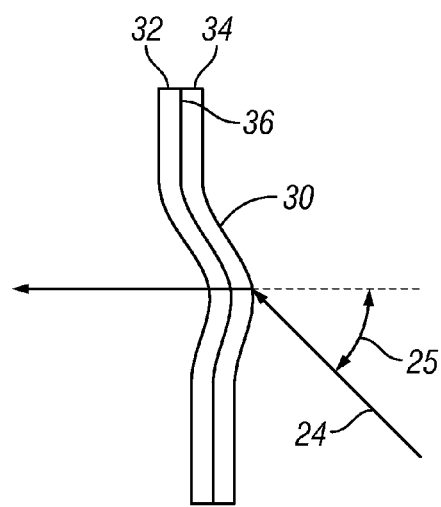

Referring now to FIG. 4, an alternative embodiment of lens member is indicated generally at 30. Lens member 30 includes first lens member 32 and second lens member 34 joined together, each of which is similar to lens member 20 shown in FIG. 3. Disposed between first lens member 32 and second lens member 34 is polarizing medium 36. Polarizing medium 36 may also be disposed on a surface of lens member 20. Those skilled in the art will appreciate that more than two lens members, such as the first lens member 32 and the second lens member 34 may be utilized to form a lens member, such as the lens member 30.

Apparatus 10 and assembly 28 in accordance with the present invention advantageous provide the wearer of helmet 12 with enhanced peripheral vision without compromising safety, as helmet 12 retains all of its safety features in helmet portion 14.

Preferably, lens members 20, 30, 32, and 34 are manufactured to various standard specifications including, but not limited to, magnification, refractive angle 25, shading, polarization, and the like. Lens members 20, 30, 32, and 34 are preferably customized as necessary. Fitting of helmet 12 preferably includes selection of lens member 20, 30, 32, or 34 by trial and error, with the assistance of manufacturer trained technicians, or by medical personnel, as appropriate. Once selected, the lens member 20, 30, 32, or 34 is preferably fused in place in slot 18 to become an integral part of helmet 12.

Apparatus 10 and assembly 28 advantageously provide a modification to a helmet, such as helmet 12 in the form of a customizable, optical-grade lens member 20, 30, 32, or 34 that employs the concept of light refraction through a prism or the like. Apparatus 10 and assembly 28 advantageously retains an original field of vision area of helmet 12 but enhances peripheral vision to the wearer of helmet 12. Helmet 12 may be any type of helmet including, but not limited to, a helmet for football, skiing, hockey, car racing, cycling, motorcycling, bicycling, and any other activity where a helmet is worn and where it is desirable to enhance the peripheral vision of the wearer of the helmet.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. An apparatus for providing enhanced peripheral vision to a wearer of a helmet, said apparatus comprising:
at least one lens member adapted to be received at a predetermined location in the helmet, said lens member operable to direct light from a side portion of the helmet to a location adjacent an eye of a wearer of the helmet.

2. The apparatus of claim 1 wherein said at least one lens member is a wedge prism lens member.

3. The apparatus of claim 1 wherein said at least one lens member is a Fresnel-type lens member.

4. The apparatus of claim 1 wherein said at least one lens member is a magnifying lens member.

5. The apparatus of claim 1 wherein said at least one lens member refracts light from the side portion of the helmet along a predetermined refracting angle to the location adjacent the eyes of the wearer of the helmet.

6. The apparatus of claim 1 wherein said at least one lens member is shaded.

7. The apparatus of claim 1 wherein said at least one lens member includes a polarizing medium disposed thereon.

8. The apparatus of claim 1 wherein said at least one lens member is a pair of lens members disposed on opposing sides of said helmet.

9. The apparatus of claim 1 wherein said at least one lens member includes a central portion curved outwardly with respect to outer portions of said at least one lens member.

10. The apparatus of claim 1 wherein said at least one lens member is formed from an optics-grade material.

11. The apparatus of claim 1 wherein said at least one lens member is formed from a polycarbonate material.

12. The apparatus of claim 1 wherein said at least one lens member is a pair of lens members joined together.

13. A helmet assembly for providing enhanced peripheral vision to a wearer of a helmet, comprising:
- a helmet member having a helmet portion and an open face portion, said helmet member defining at least one receiving portion at a predetermined location therein;
- at least one lens member adapted to be received in said receiving portion of said helmet member, said lens member operable to refract or direct light from a side portion of the helmet to a location adjacent an eye level of a wearer of the helmet.

14. The assembly of claim 13 wherein said at least one lens member includes a central portion curved outwardly with respect to outer portions of said at least one lens member.

15. The assembly of claim 13 wherein said at least one lens member is a wedge prism lens member.

16. The assembly of claim 13 wherein said at least one lens member is a Fresnel-type lens member.

17. The assembly of claim 13 wherein said at least one lens member is a magnifying lens member.

18. The assembly of claim 13 wherein said at least one lens member refracts light from the side portion of the helmet along a predetermined refracting angle to the eye level of the wearer of the helmet.

19. The assembly of claim 13 wherein said at least one lens member is formed from a polycarbonate material.

20. The assembly of claim 13 wherein said at least one lens member is a pair of lens members joined together.

21. The assembly of claim 13 wherein said predetermined location is adjacent said open face portion and an eye level of a wearer of the helmet.

22. A helmet assembly for providing enhanced peripheral vision to a wearer of a helmet, comprising:
- a helmet member having a helmet portion and an open face portion, said helmet member defining a pair of receiving slots formed on opposing sides of said helmet portion adjacent said open face portion adjacent an eye level of a wearer of the helmet;
- a pair of lens members received in said receiving slots, said lens members operable to refract or direct light from side portions of the helmet to locations adjacent the eye level of the wearer of the helmet along a predetermined refracting angle.

* * * * *